No. 734,708. PATENTED JULY 28, 1903.
J. H. HICKS.
DRILL SHARPENER.
APPLICATION FILED MAY 28, 1902.
NO MODEL. 2 SHEETS—SHEET 1.
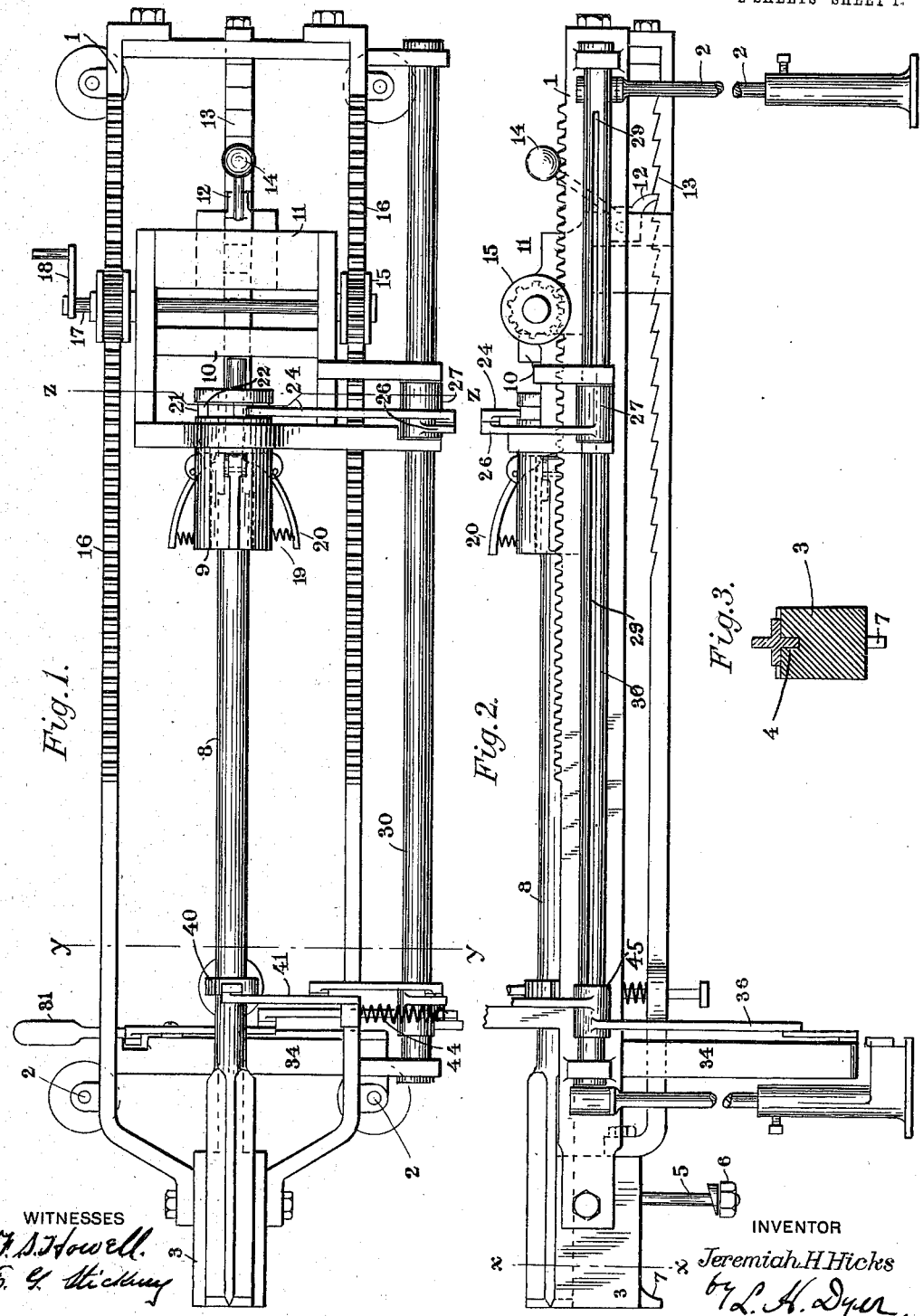
WITNESSES
F. S. Howell
E. G. Hickey
INVENTOR
Jeremiah H. Hicks
by L. H. Dyer,
Attorney.

No. 734,708. PATENTED JULY 28, 1903.
J. H. HICKS.
DRILL SHARPENER.
APPLICATION FILED MAY 28, 1902.
NO MODEL. 2 SHEETS—SHEET 2.
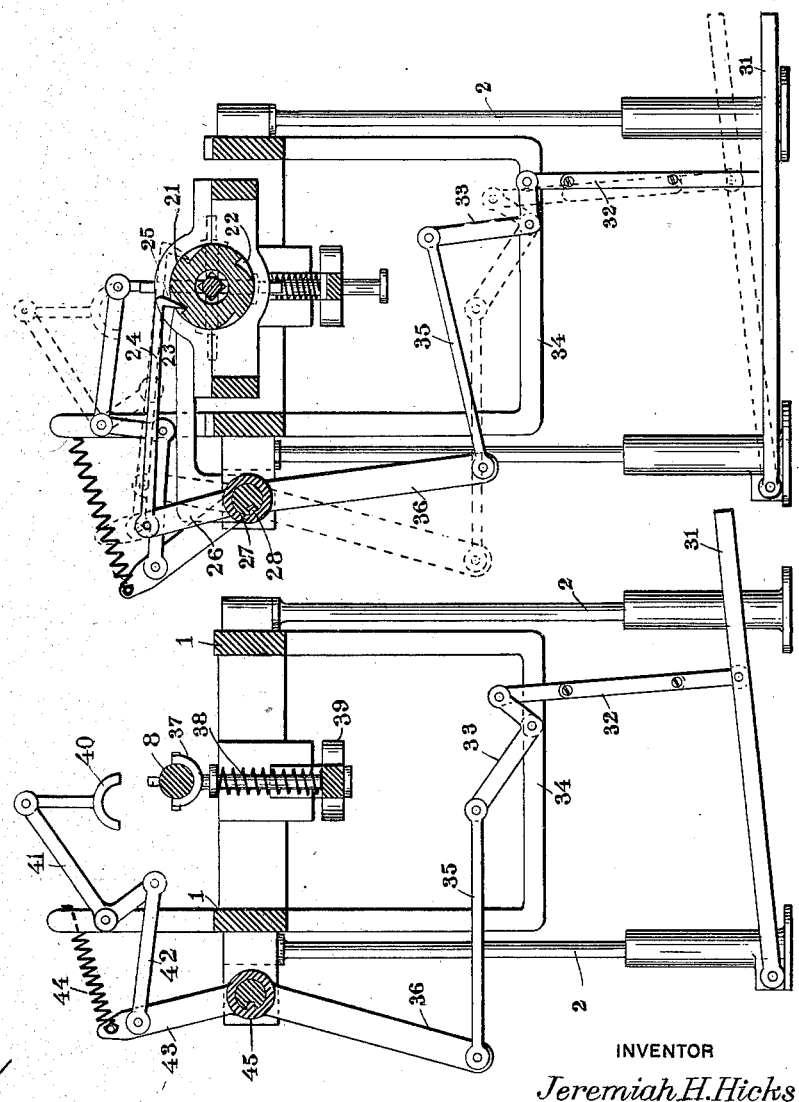
WITNESSES
F. S. Howell.
E. G. Stickney
INVENTOR
Jeremiah H. Hicks
by L. A. Dyer
Attorney.

No. 734,708. Patented July 28, 1903.

UNITED STATES PATENT OFFICE.

JEREMIAH H. HICKS, OF CENTRAL CITY, SOUTH DAKOTA.

DRILL-SHARPENER.

SPECIFICATION forming part of Letters Patent No. 734,708, dated July 28, 1903.

Application filed May 28, 1902. Serial No. 109,314. (No model.)

*To all whom it may concern:*

Be it known that I, JEREMIAH H. HICKS, a citizen of the United States, residing at Central city, Lawrence county, South Dakota, have invented certain new and useful Improvements in Drill-Sharpeners; and I do declare that the following is a full, clear, and exact description of the invention, which will enable others skilled in the art to which it appertains to make and use the same.

This invention relates to improvements in machines for assisting in sharpening drills of that type in which the cutting edge is renewed by hammering after a preliminary heating at a forge. These drills are characterized by a double chisel edge of a general X-section and cut with a reciprocating action. The drills in common use vary in length between twenty inches and seven and one-half feet. Such drills are operated by compressed air or by steam and are used in working stone, coal, and other dense minerals. The cutting edges of these drills become dull in use and the sharp corners become round.
This form of drill is usually sharpened by being heated and hammered upon a die which is supported upon an anvil. The die has a groove in which one limb of the cutting edge of the drill rests. The other end of the drill is supported by a man, who also elevates the drill clear of the groove in the die and gives it a quarter-turn after each edge is sharpened by a hammer wielded by a second man.

The objects of this invention are to produce a simple, portable, and cheap device which will support the drill in position with one of its cutting edges upon a die while the edge is being hammered to shape and will afterward rotate the drill a partial turn to successively bring other edges into position for sharpening, so as to take the place of hand labor and allow drills to be sharpened by one man, whereby the present means in use it requires the services of two.
My invention also has for its object other advantages, as will more fully appear in the following description and claims.

The device consists generally of a supporting-frame arranged adjacent to and preferably connected to the anvil through the intermediary of the die to which it is connected. The frame has adjustable legs to permit it being applied to any anvil which may be at hand and carries a chuck for supporting the rear end of the drill and a plate against which it abuts. Both chuck and plate are so arranged as to be adjusted in position upon the table that it may accommodate different lengths of drill. Means is provided for imparting to the chuck an intermittent rotary movement, which may consist of a pawl and ratchet operated by a pedal. The die is provided with a groove or depression within which one limb of the cutting end of the drill is adapted to rest. Means is provided for lifting the cutting end of the drill out of engagement with this slot before the drill is turned and to hold it in this elevated position until the drill has been turned and then permit it to be depressed and returned in position while another face of the drill is sharpened. This mechanism preferably consists of a spring-elevated support for the cutting end of the drill and a depressing-finger actuated by the same pedal that actuates the chuck-rotating pawl. With this drill-support is preferably used a tool for restoring the square corners to the cutting edges of the drill, which tool forms the subject-matter of an application for Letters Patent filed by me October 24, 1902, and numbered serially 128,581.

In order to better understand the nature of this invention, attention is directed to the accompanying drawings, in which—

Figure 1 is a top view of the complete device. Fig. 2 is a side view of the same. Fig. 3 is a section taken on the line $x\,x$ of Fig. 2. Fig. 4 is a section taken on the line $y\,y$ of Fig. 1, and Fig. 5 is a section taken on the line $z\,z$ of Fig. 1.

In all the several views like parts are designated by the same numerals of reference.

The generally rectangular frame 1 1 is supported at such a height by means of the adjustable legs 2 2 that the block 3 will rest upon and be supported by the anvil. (Not shown.) This block has a groove or slot 4, (see Fig. 3,) within which one of the nibs of the drill rests, and is secured to the anvil by means of the bolt 5 and nut 6, a depending finger 7 entering the hardy-hole in the anvil. The other extremity of the drill 8 is centered in a chuck 9 and abuts against a block 10, carried by an adjustable carriage 11. The latter is locked in position by means of a dog 12, which may engage a notch on the rack 13, the weighted arm 14 keeping the parts normally in engagement.

The carriage 11 is adjusted in position relative to the block 3 to accommodate different lengths of drill by means of the pinions 15 15, meshing with the racks 16 16. These pinions are carried upon a shaft 17, which may be rotated by means of a crank 18. The shaft 17 is journaled in bearings on the carriage.

The chuck 9 possesses several novel features. To allow the free end of the drill to be elevated sufficiently and permit a nib to clear the slot 4 in the block 3, the opening within the chuck is made sufficiently large. The drill is centered within the opening by means of the clutch 20, normally pressed inwardly by the spiral springs 19. The inner ends of the clutches engage with the round portion of the drill and will prevent it turning, while at the same time the other extremity of the drill may be elevated. Owing to the elastic support for the drill thus provided, the parts will not easily become disarranged by the vibration incident to the hammering operation upon the cutting end of the drill.

The chuck is given an intermittent one-quarter revolution by means of the mechanism illustrated in Fig. 5. To the rear end of the chuck is formed a groove 21, in which are four notches 22. To one of these notches is adapted to engage the hook 23, formed upon the free extremity of a floating rod 24. By a reciprocating motion of the latter the hook may be made to successively engage with the notches and by a retroactive motion will give the chuck an intermittent rotary motion. The cam extension 25 engages with the succeeding notch and guides the hook 23 over the latter. The rod 24 is pivoted to an upright lever 26, carried upon a sleeve 27, which is adapted to slide along the shaft 30, being prevented from turning thereon by means of a feather 28, which enters and engages with a groove 29, cut within the shaft.

A partial turn is imparted to the shaft 30 by means of a pedal 31 through the intermediary action of a jointed pitman 32, bell-crank lever 33, pivoted to the portion 34 of the frame 1, and rod 35. The latter is pivoted to the lower end of a lever 36, secured to a sleeve 45. In the operation of this portion of the device through the depression of the pedal 31 and pitman 32 the bell-crank lever 33 will be partially turned upon its pivot, the rod 35 retracted, and the lever 36 moved to the position shown in full lines in the drawings. The parts are automatically returned to position by the action of a spring 44, attached to a lever 43, secured to a sleeve 45, which is mounted upon the shaft 30. From the above description it is clear that a quarter-turn may be given to the clutch by a single depression of the pedal.

The mechanism for elevating the free extremity of the drill while it is being turned and for securing it in position against the block is illustrated in Fig. 4. The shank of the drill rests in a movable support 37, which is normally elevated by a spiral spring 38, engaging with a portion 39 of the frame 1. This portion 39 is shown in Fig. 2 as being integral with the rack 13. The drill is held in position against the block 3 by means of the finger 40, its shank portion being pivoted to one arm of a bell-crank lever 41, the other arm of which is pivoted to a rod 42. The latter is connected with the arm 43, before referred to. As shown in Fig. 4, the support 37 and finger 40 are in the elevated position. This they will assume when pressure upon the pedal 31 is removed. Upon the latter being depressed the finger 40, through the action of the arms 43, rod 42, and bell-crank lever 41, will be lowered and, engaging with the drill, will depress it and the support 37 against the tension of the spring 38 and will hold the cutting end of the drill in position upon the block 3.

The operation of the complete device will be readily understood from the foregoing description, it being understood that the drill is preliminarily heated and while hot is placed upon the frame with the cutting edge upon the block 3, with one nib resting in the slot 4 and with the other extremity within the chuck 9, abutting against the block 10. The carriage is, if necessary, then adjusted to bring the cutting edge of the drill at the proper position upon the face of the block. The operator then sharpens one face of the drill by means of hammering with a sledge, the drill being held immovably in position by means of the finger 40, one foot of the operator being kept upon the pedal to depress it. After one face of the drill is prepared the pressure upon the pedal is released and the cutting end of the drill thereby elevated by means of the action of the spring 38 until the nib is clear of the slot in the block and the hook 23 has engaged with another notch 22. Upon the pedal being again depressed the chuck will be turned and the cutting end of the drill lowered in position upon the block, when a new face will be brought into position for action.

To preliminarily square the cutting edge of the drill, the tool described in my copending application for patent, Serial No. 128,581, is employed. After the cutting edges are squared the tool may be then removed and the drill transferred to the holding device either directly or after a second heating.

From the foregoing description it is clear that the operation of squaring and sharpening drills may be accomplished with the services of one man, the services of the hitherto indispensable helper being dispensed with.

What I claim is—

1. In a device of the character described, the combination with means for supporting the cutting end of the drill, of spring-actuated means for elevating the drill, and means actuated by the operator for intermittently rotating and depressing the drill, substantially as described and shown.

2. In a device of the character described, the combination with a grooved block for supporting the cutting end of the drill, of means for elevating the cutting end of the drill clear of the groove, and means for rotating the drill, and means for depressing the drill, substantially as described and shown.

3. In a device of the character described, the combination with a block for supporting the cutting end of the drill, spring-actuated means for raising and means actuated by the operator for lowering that end of the drill, a chuck for supporting the other end of the drill, adjustable means for supporting the chuck, and means for rotating the chuck, substantially as described and shown.

4. In a device of the character described, the combination with a block for supporting the cutting end of the drill, spring-actuated means for raising and means actuated by the operator for lowering that end of the drill, a chuck for supporting the other end of the drill, adjustable means for supporting the chuck, and means for intermittently rotating the chuck.

5. In a device of the character described, the combination with a frame, a block thereon, means for supporting a drill thereupon, and means for detachably attaching the block to an anvil, substantially as described and shown.

6. In a device of the character described, the combination with a frame, of an adjustable carriage thereon carrying a chuck, a shaft, means for imparting rotary motion to the shaft, and connections between the shaft and chuck for rotating the latter, substantially as described and shown.

7. In a device of the character described, the combination with a frame, of an adjustable carriage thereon carrying a chuck, a shaft, means for imparting rotary motion to the shaft, and connections between the shaft and chuck for intermittently rotating the latter, substantially as described and shown.

8. In a device of the character described, the combination with a frame, of a supporting-block, an adjustable carriage, a chuck thereon, a shaft, means for imparting rotary motion to the shaft, connections between the shaft and chuck for rotating the latter, a spring-elevated support for the cutting end of the drill, and a depressing-finger adjacent thereto, and connections between said finger and shaft, substantially as described and shown.

9. In a device of the character described, the combination with a block for supporting the cutting end of the drill, a chuck for supporting the other end of the drill, a carriage for supporting the chuck, a supporting-frame for the carriage, a shaft, means for imparting rotary motion to the shaft, and connections between the shaft and chuck for intermittently rotating the latter.

10. In a device of the character described, the combination with a block for supporting the cutting end of the drill, a chuck for supporting the other end of the drill, a carriage for supporting the chuck, a supporting-frame for the carriage, a shaft, a pedal and connecting-rod for imparting rotary motion to the shaft, and connections between the shaft and chuck for intermittently rotating the latter.

11. In a device of the character described, the combination with a block for supporting the cutting end of the drill, a chuck for supporting the other end of the drill, a series of notches on said chuck, a carriage for supporting the chuck, a supporting-frame for the carriage, a shaft, means for imparting rotary motion to the shaft, an arm, and a pawl arranged between the shaft and chuck for successively engaging the notches and rotating the chuck.

12. In a device of the character described, the combination with a block for supporting the cutting end of the drill, a chuck for supporting the other end of the drill, a series of notches on said chuck, a carriage for supporting the chuck, a supporting-frame for the carriage, a shaft, a pedal and connecting-rod for imparting rotary motion to the shaft, an arm, and a pawl arranged between the shaft and chuck for successively engaging the notches and rotating the chuck.

13. In a device of the character described, the combination with a block for supporting the cutting end of the drill, spring-actuated means for elevating the cutting end of the drill, a chuck for supporting the other end of the drill, a carriage for supporting the chuck, a supporting-frame for the carriage, a shaft, means actuated by the operator for imparting rotary motion to the shaft and depressing the cutting end of the drill, and connections between the shaft and chuck for intermittently rotating the latter.

14. In a device of the character described, the combination with a block for supporting the cutting end of the drill, spring-actuated means for elevating the cutting end of the drill, a chuck for supporting the other end of the drill, a carriage for supporting the chuck, a supporting-frame for the carriage, a shaft, a pedal and connecting-rod for imparting rotary motion to the shaft, connections between the shaft and chuck for intermittently rotating the latter, and connections between the shaft and drill for depressing the cutting end of the latter.

15. In a device of the character described, the combination with a block for supporting the cutting end of the drill, spring-actuated means for elevating the cutting end of the drill, a chuck for supporting the other end of the drill, a series of notches on said chuck, a carriage for supporting the chuck, a supporting-frame for the carriage, a shaft, means for imparting rotary motion to the shaft, an arm, a pawl arranged between the shaft and chuck for successively engaging the notches and rotating the chuck, and connections between the shaft and drill for depressing the cutting end of the latter.

16. In a device of the character described, the combination with a block for supporting the cutting end of the drill, spring-actuated means for elevating the cutting end of the drill, a chuck for supporting the other end of the drill, a series of notches on said chuck, a carriage for supporting the chuck, a supporting-frame for the carriage, a shaft, a pedal and connecting-rod for imparting rotary motion to the shaft, an arm, a pawl arranged between the shaft and chuck for successively engaging the notches and rotating the chuck, and connections between the shaft and drill for depressing the cutting end of the latter.

This specification signed and witnessed this 20th day of May, 1902.

JEREMIAH H. HICKS.

Witnesses:
L. E. PHILLIPS,
C. O. GORDER.